United States Patent [19]

Kanigowski

[11] Patent Number: 5,452,868
[45] Date of Patent: Sep. 26, 1995

[54] ADJUSTABLE LUMBAR SUPPORT WITH REMOTE PUSH-BUTTON CONTROL

[75] Inventor: Andrew S. Kanigowski, La Crescenta, Calif.

[73] Assignee: FutureFlite Corporation, Carson City, Nev.

[21] Appl. No.: 370,154

[22] Filed: Jan. 9, 1995

Related U.S. Application Data

[63] Continuation of Ser. No. 799,400, Nov. 27, 1991, Pat. No. 5,174,526.

[51] Int. Cl.$^6$ .................................................. B64D 25/115
[52] U.S. Cl. .................................. 244/122 R; 244/118.5; 297/294.4
[58] Field of Search ..................... 244/122 R, 115.5, 244/122 AG; 297/284.4, 284.1

[56] References Cited

U.S. PATENT DOCUMENTS

| | | | |
|---|---|---|---|
| 3,730,019 | 5/1973 | Ballard | 244/122 R |
| 3,807,794 | 4/1974 | Bayar | 297/294.4 |
| 4,556,251 | 12/1985 | Takagi | 297/284.4 |
| 4,576,410 | 3/1986 | Hattori | 297/284.4 |
| 4,790,496 | 12/1988 | Marrajo | 244/122 R |
| 5,026,116 | 6/1991 | Dal Moate | 297/284.4 |
| 5,135,282 | 8/1992 | Pappers | 297/284.4 |
| 5,197,780 | 3/1993 | Coughlin | 297/284.4 |
| 5,314,236 | 5/1994 | Suzuki | 297/284.4 X |

Primary Examiner—Margaret A. Focarino
Assistant Examiner—Christopher Ellis

[57] ABSTRACT

Presentation of an improved adjustable lumbar support mechanism with a remote control push-button and cable (10) for use in a seat backrest. The cable is routed to a hydraulic (or pneumatic) positioning cylinder (12) which has a locking capability and integral spring-load force to permanently preload a lumbar support panel (20) in a direction opposing the pressure from the seat occupant's back. A new principle of operation of the "manual" lumbar support is utilized, in which the force from a human's back is used to conveniently readjust the lumbar position (counterbalancing the spring), not the force in the operator's hand. The new lumbar system is a fast-acting device compared to traditional knob-driven units and permits frequent, quick, and easy readjustment of lumbar position whenever the push-button is depressed.

3 Claims, 5 Drawing Sheets

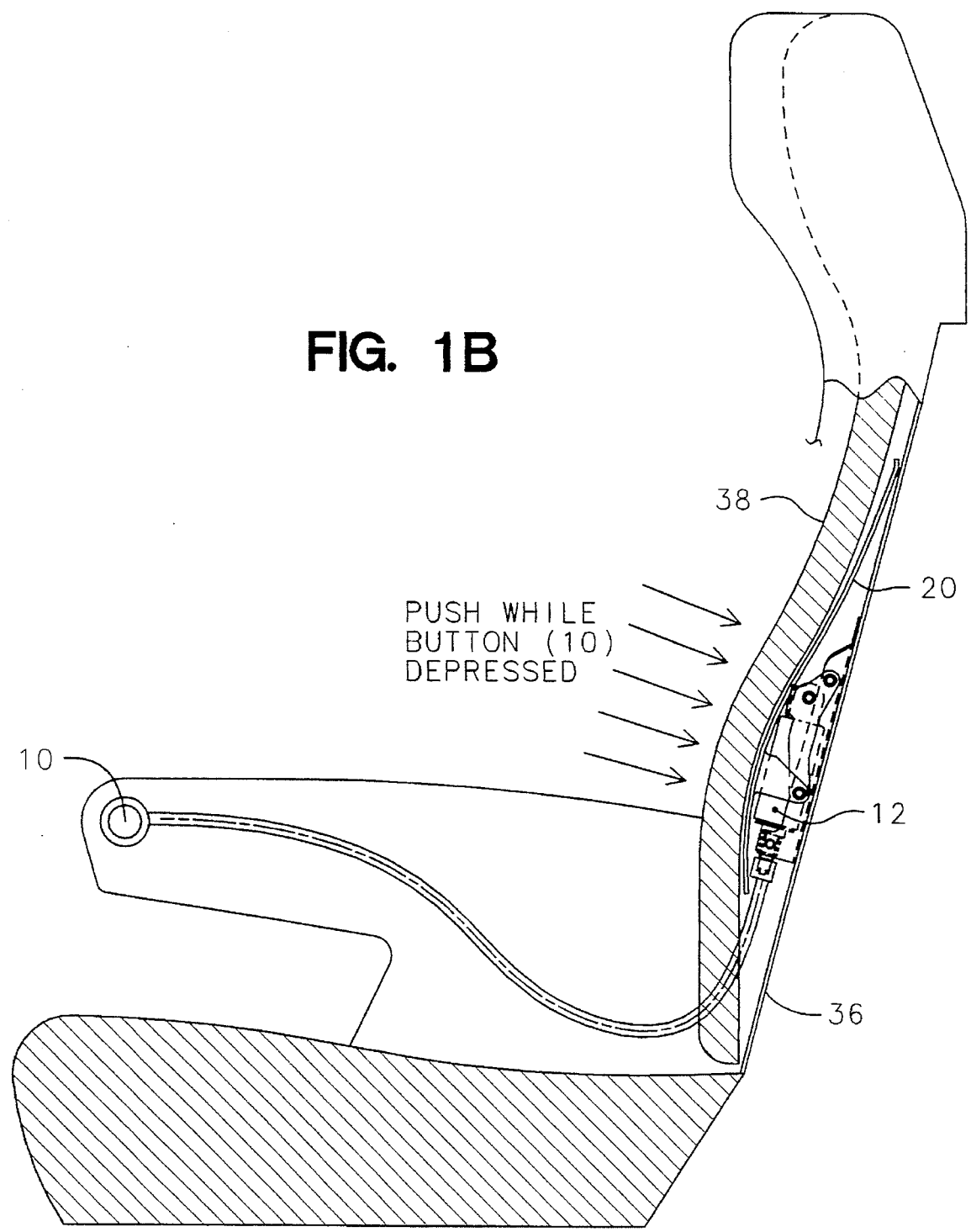

ADJUSTABLE LUMBAR SUPPORT WITH REMOTE PUSH-BUTTON CONTROL

REFERENCE TO RELATED APPLICATIONS

This application is a continuation application of my U.S. Ser. No. 799,400 filed Nov. 27, 1991, now U.S. Pat. No. 5,174,526. The priority date of Nov. 27, 1991 is hereby claimed for the subject matter in this application that is common to the earlier-filed application.

BACKGROUND OF THE INVENTION

This patent application covers a new and original design in the statutory class of machines. This invention relates to the mechanism of adjustable lumbar support installed in the backrest support of the seats for human occupants. More particularly, this invention involves a unique method of operation and remote adjustment of the "manual" lumbar support.

There are various adjustable lumbar support mechanisms available in a seat backrest. Typically, these lumbar systems can be divided into three basic groups:

Group 1: Mechanical lumbar units (also known as "manual" lumbar units) with adjustment control knobs located on the side of the seat backrest. The knobs are linked to the moveable lumbar support pad. One knob moves the pad in fore/aft direction, the other knob (if utilized) is for vertical adjustment of the lumbar pad. This group is the most popular.

Group 2: Inflatable lumbar units with a pump and/or valve to inflate a rubber bag located under the seat back cushion. Hand squeezing of the pump (or opening of the valve) inflates the bag and creates forward adjustment of the lumbar cushion. In the opposite direction, opening of the vent and pushing backward causes the bag to deflate, thus creating the "aft adjustment".

Group 3: Electrical lumbar units with a remote control switch wired to the electrical motor. A motor is coupled to the adjustable mechanical lumbar described above in Group 1 (instead of the knob) or to the pump inflating the bag as described in Group 2.

Unfortunately, the above lumbar systems are generally slow in operation, inconvenient or expensive, and often not easily adaptable for installation on a wide range of seat types. For example, electrical units require a source of power, while inflatable lumbar bags are wobbly and unreliable (punctures, pressure leaks, etc). In case of typical mechanical units, a considerable muscular power in the hand of the seat occupant is needed to turn the knobs and readjust the lumbar position. In addition, often there is not enough room for control knobs in multiple seats arranged tightly side-by-side such as in the airline tourist class seats.

DISCLOSURE OF THE INVENTION

This design innovation is related to the adjustable lumbar support mechanism which is free of the above-described problems and which does not require any external power sources. Instead, a simple spring-load element with locking capability is added to the lumbar linkage system, to permanently preload the lumbar support panel in a direction opposing the pressure from the seat occupant's back. Consequently, a new principle of operation of the "manual" lumbar support is utilized, in which the force from a human's back is used to conveniently readjust the lumbar position (by counterbalancing the spring), not the force in the operator's hand. The hand (or rather finger) is only used to unlock the forward-acting spring-load force of the lumbar support panel.

As shown on submitted drawings, this design innovation eliminates existing control knobs (or wheels) for manual lumbar adjustment and replaces it with a simple push-button and cable control that is activated by an effortless finger push only. The push-button element is remotely located in the seat armrest for easy access and for convenience of the seat occupant.

For better understanding, the reader may recall his/her last flight in the airline seat and the way the seat back recline angle is adjusted using remote control push-button. The only difference is that a familiar button is linked not to the seat backrest recline mechanism but to the adjustable lumbar support mechanism that provides a moveable lumbar cushion pad in the area of the seated occupant's lower back and spine. In both cases, force from the human's back is used to readjust the position by counterbalancing the forward-acting force of the built-in spring-load element.

The construction of my new lumbar support mechanism is described in full detail in the next section—DETAILED DESCRIPTION OF THE DRAWINGS. The following is a description of the operation method and the essence of the new lumbar adjustment principle:

a). Light pressing by the finger on the control push-button unlocks the moveable lumbar support panel element located under the seat back cushion and releases its forward-acting spring-load force, trying to push the lumbar cushion forward.

b). When the control button is depressed (lumbar unlocked) and pressure on the seat back is removed (occupant is leaning or bending forward) the spring-loaded lumbar panel/cushion is free to move all the way to the forward end of adjustment limit—toward the back of the seated occupant.

c). With the lumbar control button depressed (lumbar unlocked) the seat occupant may also lightly push back against the spring-loaded lumbar support panel, leaning back to counterbalance the spring, in order to achieve desired posture of the lower back. The adjustment works in both directions, whether the occupant is pushing backward or bending forward to relieve the pressure. Then the button is released to lock-in any such selected lumbar adjustment position.

d). When the control button is not depressed (lumbar locked) the lumbar support panel is immobilized and holds any intermediate adjustment position selected earlier by the seat occupant. This position does not change when the seat occupant moves in his/her seat or when a variable back pressure is applied at the seat back in the lumbar region.

e). The spring-loaded lumbar support panel (under the seat back cushion) is contoured to match the natural curvature of the human spinal column while in the proper sitting posture, with emphasis on the ergonomically correct bow of the lower spine area. In addition, the lumbar support panel is fairly flexible and is pivotally connected underneath, to permit a tilt motion of the lumbar panel in order to accommodate vertical differences of spinal column shape among the population (variable height/shape of the lower spine bow in various individuals).

f). Total adjustment range is about three inches between both extreme positions in fore/aft direction. In addition, the tilt and flex motion (as described above) eliminates the need for a vertical lumbar adjustment. Consequently, the combined Fwd/Aft and Tilt/Flex motion capability of the lumbar support panel as described here allows a very close match to any natural curvature of the human spine while bending, at any realistic vertical position of the spinal bow. The increments of adjustment are infinite (continuous) within the adjustment range.

g). The adjustable lumbar system as described here is really superior, effortless, and a fast-acting device compared to traditional knob-driven units. The new lumbar mechanism follows any spinal column bending shape immediately after the control button is depressed. This feature permits an instant, quick, and frequent position readjustment without the need for repeated forcing of the knob resistance by operator's hand.

It is the objective of this invention to provide a simple, lightweight, very dependable, and inexpensive lumbar support device that is "user-friendly" and easily adjustable without the need for undue muscular effort in the operator's hand. And without the necessity to employ the electric motor and remote control switch. Such a simple mechanical-type lumbar system was first described in my prior related U.S. Pat. No. 5,174,526, in which the main independent Claim 1 recites among other elements:

"a mechanical spring-load means to provide a pre-loaded force to said moveable lumbar support panel element wherein said force acts against an occupant's back when said control push-button is depressed" and "a mechanical locking means assembly coupling said moveable panel to a rigid backrest support frame and permitting selected positioning of said moveable lumbar support panel element".

In present continuation application, the above-described two separate elements of the "mechanical spring-load means" and "mechanical locking means" may be combined into just one convenient element providing necessary spring-load force AND locking capability in the same unit. It is hereby disclosed that the following commercially available positioning devices with integral spring-load force and with built-in lock, which were originally developed for other applications, are also very well suited for use in this new adjustable lumbar support mechanism as described here:

(a) a hydraulic locking cylinder with compression spring sold by P. L. Porter Company under the trademark "Hydrolock" for use in push-button controlled recline mechanisms for the backs of aircraft seats and/or bus seats (or equivalent hydraulic locking cylinders from other manufacturers), (b) a pneumatic locking cylinder with integral spring-load force of a nitrogen gas under pressure sold by Vogel/Mesag Company under the trade name "N2-LOK" for use in push-button controlled recline mechanisms for the backs of seats in buses, trains and airplanes (or equivalent pneumatic cylinders from other manufacturers).

The improved design of a simplified lumbar support mechanism and convenient method of adjustment as disclosed here is intended for use in a wide range of seating systems, including but not limited to originally described airline passenger seats. The adjustable lumbar system covered by this continuation patent application was conceived, financed, developed, and is manufactured by FutureFlite Corporation, for world-wide distribution under the trade name "FutureFlite Lumbar System".

Both P. L. Porter Company and Vogel/Mesag Company have independently modified and/or adapted their existing products, hydraulic and pneumatic locking cylinders respectively, to meet the specification requirements of this invention, in order to fit and work also in this newly expanded FutureFlite Lumbar System application.

BRIEF DESCRIPTION OF THE DRAWINGS

In the drawings, closely related figures have the same number but different alphabetic suffixes.

FIG. 1B shows side view of seat, lumbar support panel in maximum rearward adjustment position.

DETAILED DESCRIPTION OF THE DRAWINGS

Figure 1A:
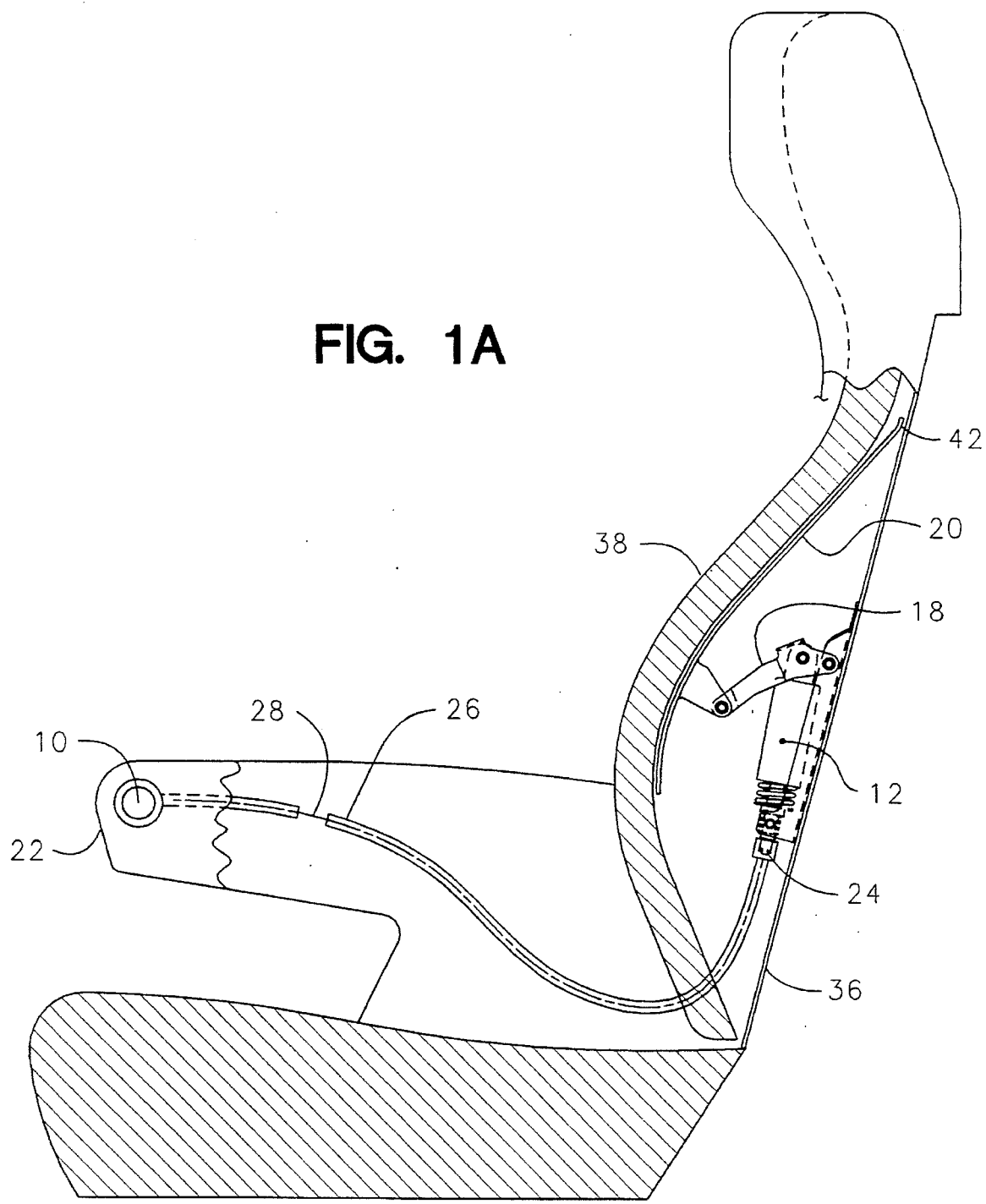
FIG. 1A shows side view of seat, lumbar support panel in maximum forward adjustment position.
Figure 2:
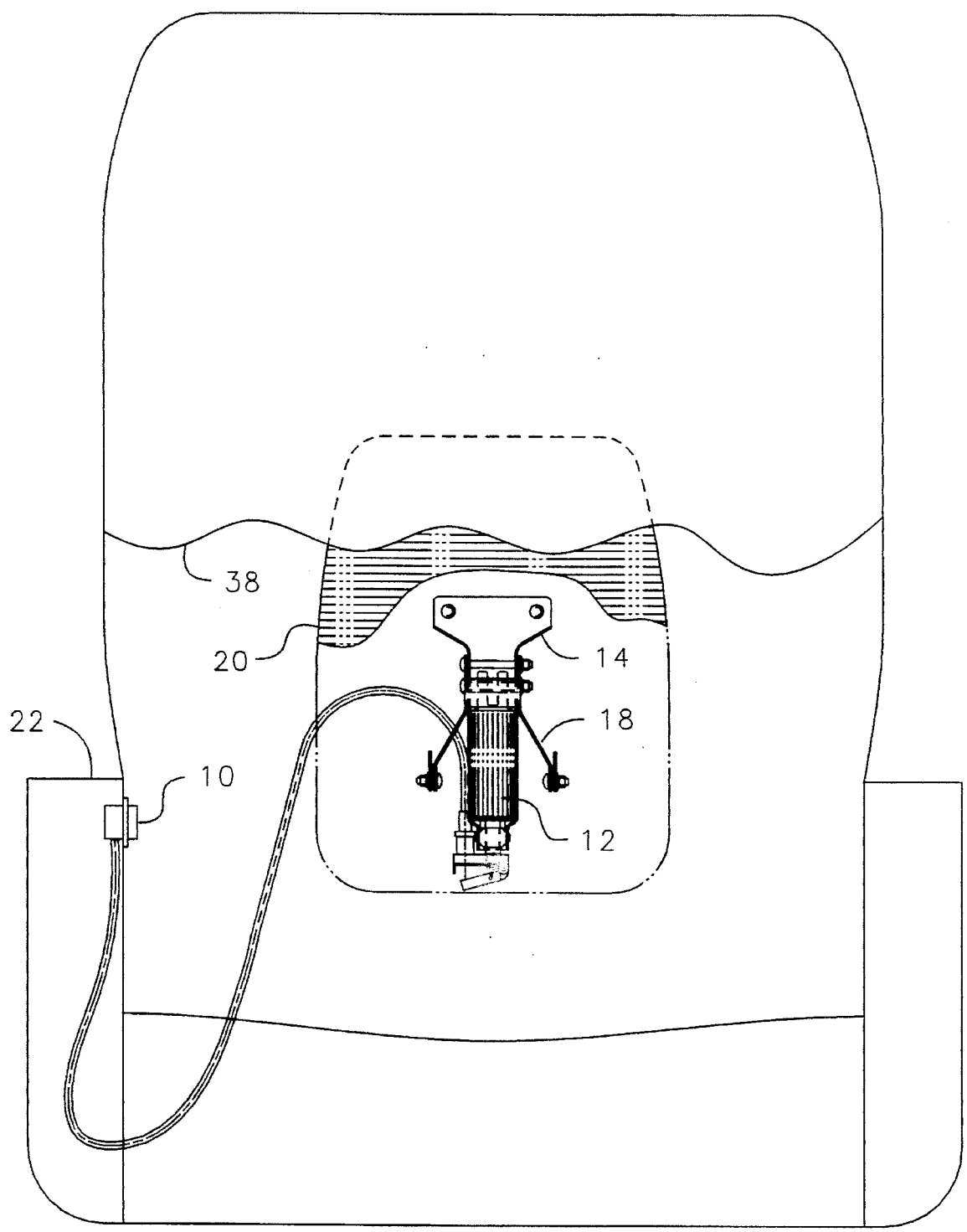
FIG. 2 shows front view of seat, lumbar support panel installed under the seat back cushion.
Figure 3:
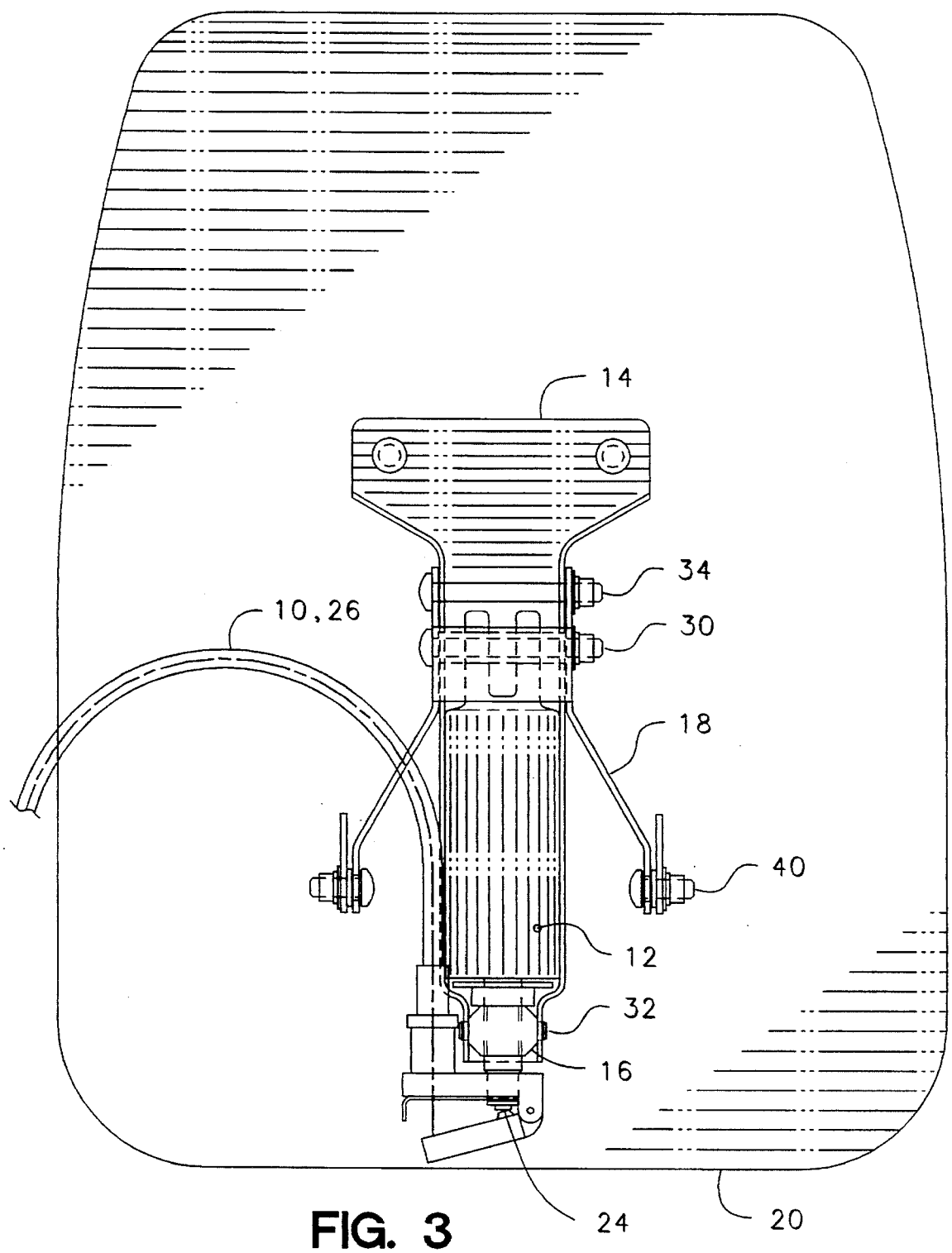
FIG. 3 shows front view of lumbar support mechanism in close-up detail to show all elements of assembly.

The FutureFlite Lumbar System is a simple assembly containing few parts only. It has a control push-button and cable 10, a hydraulic (or pneumatic) positioning/locking cylinder 12 with integral spring-load force, a mounting base 14, a trunnion 16, a lever 18, and a moveable lumbar support panel element The control push-button and cable assembly 10 is virtually identical to the control button and cable assembly as is currently used for the airline seat back recline angle adjustment. The button end is installed into a mounting hole in the seat armrest 22. The flexible cable is routed inside of armrest structure and runs toward the lumbar support panel, with the other end of the control cable attached to a trigger end 24 of the positioning/locking cylinder 12. The control cable is of standard "pull" type, and it has an external conduit sleeve 26 and an internal wire 28. Finger push on the control button pulls the internal wire inside of the conduit, which in turn activates the trigger element 24 of the positioning/locking cylinder 12 and releases the spring-load action of the cylinder. Then the cylinder is free to extend axially under its own integral spring-load force, which rotates the lever 18, and lifts the moveable lumbar support panel 20.

The positioning/locking cylinder 12 can be either a hydraulic locking cylinder with integral compression spring such as the Hydrolock from P. L. Porter Company (or equivalent), or a pneumatic locking cylinder with integral spring-load force of nitrogen gas under pressure such as the N2-LOK from Vogel/Mesag Company (or equivalent). Either cylinder is longitudinally extensible under its own integral spring-load force and contractible when an external load is applied to compress the cylinder axially. The positioning/locking cylinder 12 controls the spacing between two members of assembly when these two members are attached to the opposite ends of cylinder.

Figure 4:
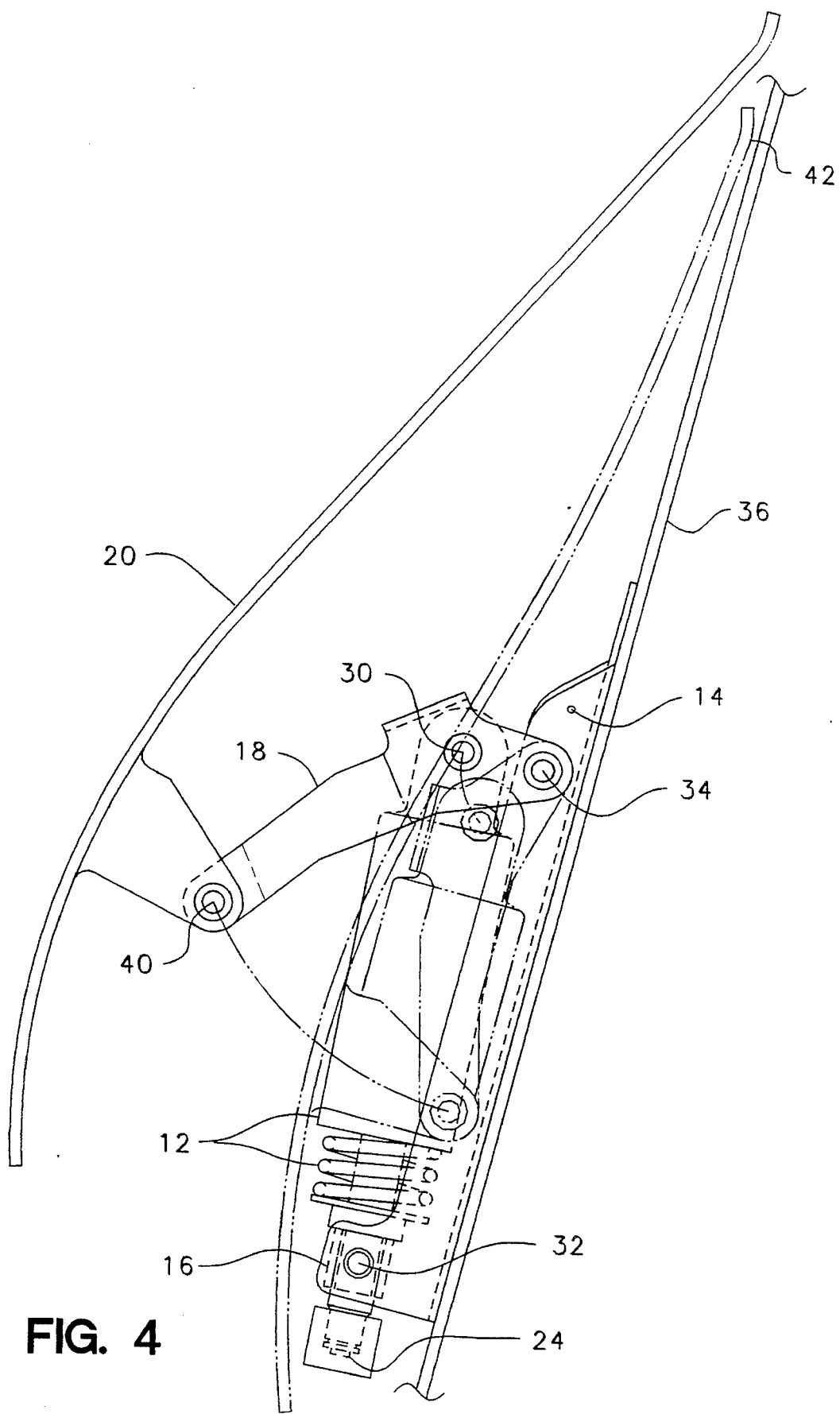
FIG. 4 shows side view of lumbar support mechanism in close-up detail to show the kinematics of adjustment.

In the FutureFlite Lumbar System the positioning/locking cylinder 12 is engaged on one end in a relatively stationary trunnion 16, the other end is attached to a moveable lever 18 at the attachment pivot point 30. Both, the trunnion 16 and lever 18 are also pivotally attached to the mounting base 14, with respective pivot points 32 and 34 being fixed dimensionally at constant distance. The mounting base 14 is attached in front of the rigid seat backrest structure 36 and underneath a lumbar seat back cushion 38. Extension and retraction of the positioning/locking cylinder 12 causes the lever 18 to rotate at its pivot point 34 as shown on FIG. 4.

The moveable lumbar support panel element 20 is attached to lever 18 at pivot point 40 and is free to tilt and move in a generally fore/aft direction to follow the motion of lever. The lumbar support panel 20 is made of fairly flexible sheet of material and is formed in a generally convex shape conforming to the back of a sitting human. The lumbar support panel 20 is positioned just underneath the seat back cushion 38 in the lumbar area, with its upper end 42 allowed to rest and slide freely on the front face of the rigid seat backrest structure 36.

Arranged this way, the lumbar support panel 20 is constantly pre-loaded with the forward-acting spring-load force, because the cylinder 12 rotates the lever 18, causing the forward push on the lumbar cushion 38 whenever the control button 10 is momentarily depressed. Consequently, the fore/aft adjustment of the lumbar cushion/panel is available in three simple steps:

(a) Just depress the control button to unlock the spring-load action of the lumbar panel.
(b) Position your body to the desired posture while leaning back to counterbalance the spring.
(c) Release the button to lock in that lumbar adjustment position.

The new adjustable lumbar support mechanism as described here is easy to build, install and operate on many different seats/chairs for human occupants. As shown in my original U.S. Pat. No. 5,174,526, the new adjustable lumbar mechanism will benefit all occupants by minimizing lower back pain, and by providing much more comfort during long seating periods.

Identical to my original patent '526 this continuation application also utilizes a spring-load force acting forward, toward the back of the seat occupant, when a remote control push-button is depressed. This baseline arrangement is common in both cases. However, present continuation application specifically introduces the hydraulic locking cylinder and/or pneumatic locking cylinder, both of which are very beneficial in many ways, mainly because of their inherent damping characteristics making the improved lumbar system very smooth and quiet in operation. Otherwise, both the original invention and presently improved arrangement permit an automatic, frequent, quick, and easy readjustment of the lumbar position with a single touch of said control push-button. This eliminates the need for a considerable muscular force in the hand of the seat occupant and transmission means necessary to develop a rotational energy to operate and readjust a conventional mechanical (manual) lumbar systems of the prior art.

Although the description above and drawings submitted contain many specificities, these should not be construed as limiting the scope of this invention but as merely providing illustrations of some of the presently preferred embodiments of this innovation. For example, the control push-button may be replaced with a small lever, both activated the same way, with the finger pressing on the control lever being equivalent to pressing on the control button. Thus the scope of this invention should be determined by the appended claims and their legal equivalents, rather than by the examples given.

I claim:

1. An improved adjustable lumbar support mechanism adapted for use in a seat backrest, comprising:

(a) a moveable lumbar support panel element positioned underneath a lumbar seat back cushion, (b) a locking means assembly coupling said moveable panel to a backrest support frame and permitting selected positioning of said moveable lumbar support panel element;

(c) a mechanical control push-button and cable assembly for manual disengagement of said locking means assembly with a push-button element installed remotely in a seat armrest and with a cable end routed and connected to a trigger element of said locking means, and;

(d) a spring-load means to provide a preloaded force to said moveable lumbar support panel element, wherein said force acts against an occupant's back to counterbalance a pressure from said occupant's back when said control push-button is depressed said locking means assembly and said spring-load means being combined to form one component comprising an extensible hydraulic or pneumatic locking cylinder with an integral spring, wherein said locking cylinder further includes a controllable trigger means to momentarily unlock the cylinder and release its spring-load action;

whereby such improvement provides:

(e) a quick and easy readjustment of the lumbar cushion position whenever said control push-button is depressed and when a light pressure is simultaneously applied against the seat back to a desired lumbar adjustment position;

(f) a firm support of the lower back of the seat occupant throughout an adjustment range and regardless of the pressure applied on the seat back as long as said push-button is not depressed.

2. An adjustable lumbar support mechanism as set forth in claim 1 wherein said moveable lumbar support panel element is made from a fairly flexible sheet of material of sufficient size to support a human's lower back, is formed in a generally convex shape conforming to the back of a sitting person, and is pivotally connected underneath to permit a tilt motion and hence to accommodate vertical differences of spinal column shape among the population, thereby eliminating the need for a vertical lumbar adjustment.

3. An adjustable lumbar support mechanism as recited in claim 1 wherein one end of said extensible locking cylinder is connected to said backrest support frame, while the other end is pivotally attached to a leverage means for supporting underneath said moveable lumbar support panel element.

* * * * *